UNITED STATES PATENT OFFICE.

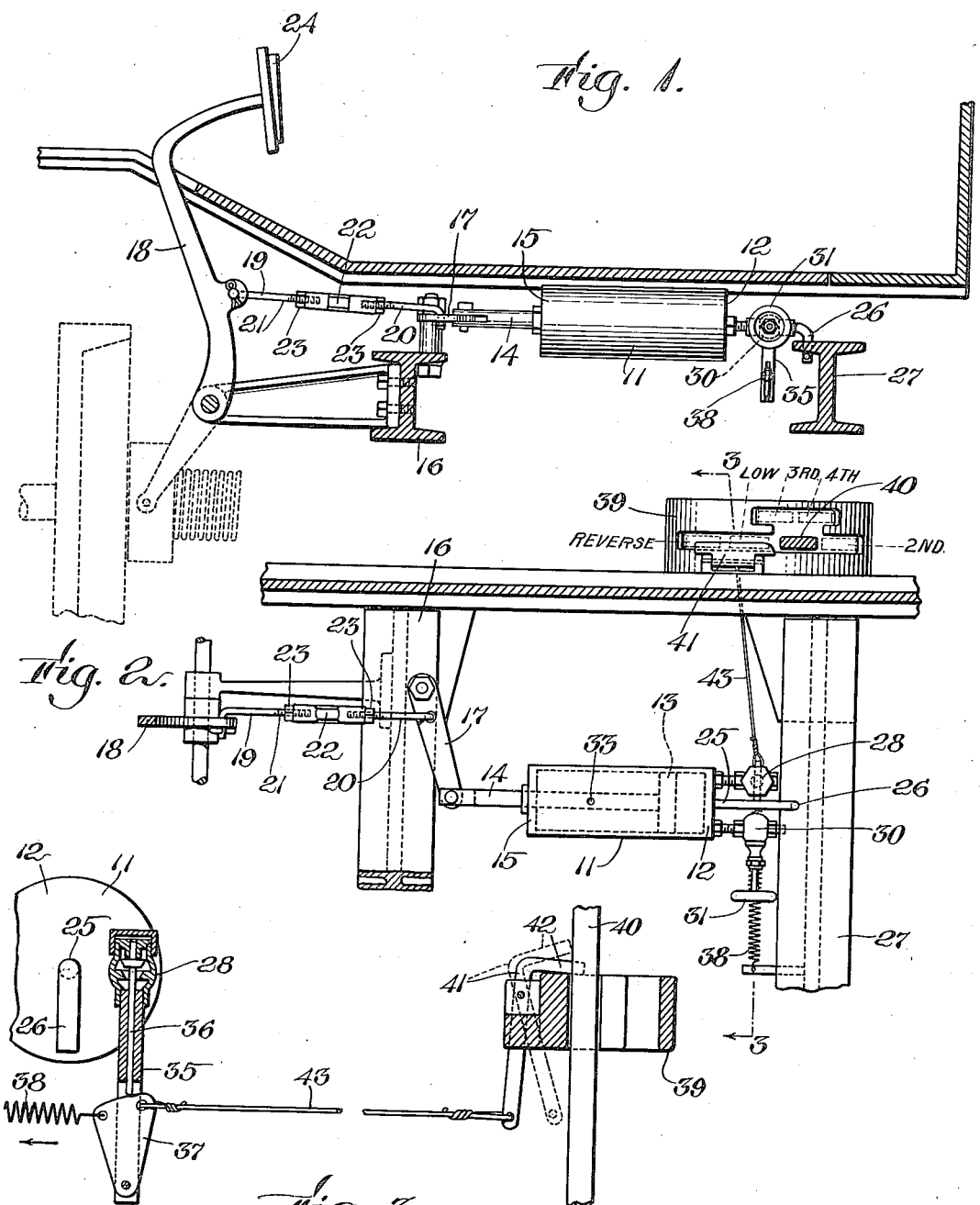

JOHN E. HOLDEN, OF SOUTH BOSTON, MASSACHUSETTS, ASSIGNOR OF ONE-THIRD TO EDITH I. JACKSON, OF NEWTON, MASSACHUSETTS, AND ONE-THIRD TO THOMAS W. MORAN, OF SOUTH BOSTON, MASSACHUSETTS.

CLUTCH-CONTROLLING DEVICE.

1,240,343. Specification of Letters Patent. Patented Sept. 18, 1917.

Application filed January 7, 1916. Serial No. 70,750.

*To all whom it may concern:*

Be it known that I, JOHN E. HOLDEN, a citizen of the United States, residing at South Boston, in the county of Suffolk and State of Massachusetts, have invented certain new and useful Improvements in Clutch-Controlling Devices; and I do hereby declare the following to be a full, clear, and exact description of the invention, such as will enable others skilled in the art to which it appertains to make and use the same.

The present invention relates to motor vehicles, and more particularly to clutch controlling devices for the same.

Considerable difficulty has heretofore been experienced in properly applying or closing the clutch which connects the engine or motor with the driving wheels. Owing to the lack of skill on the part of the operator, or because of the design of the clutch or condition of the clutch surfaces, the clutch may operate too quickly and without sufficient preliminary slipping, and as a result either the engine will be stalled or the vehicle will be started with a violent jerk, putting a severe strain upon the mechanism and causing discomfort to the passengers. With some types of clutches even the most skilled operator finds difficulty in avoiding this sudden seizure of the clutch.

Many attempts have been made to design a clutch which would be simple in construction and which would invariably operate with sufficient slipping before final connection so that even an unskilled and inexperienced operator would avoid the stalling of his engine or the liability of damage to the mechanism and discomfort to the passengers. Such attempts, however, have met with only partial success, and the majority of motor vehicles in use at the present time are equipped with clutches which either on account of their design or through wear and lack of attention have to a greater or less degree this objectionable tendency to grab or seize notwithstanding the exercise of great care and skill on the part of the operator.

The object of the present invention is to provide a controlling device which may be applied to practically any type of motor vehicle clutch, and which will automatically, and without the exercise of any skill on the part of the operator, control the closing of the clutch, so that all danger of stalling the motor, or of imparting dangerous strain to the mechanism and discomfort to the passengers will be avoided.

Another object of the present invention is to provide a controlling device for a motor vehicle clutch which shall permit the clutch to be closed or applied in substantially the same uniform manner, and irrespective of the extent of movement of the clutch pedal in disconnecting the clutch beyond a predetermined point.

A further object of the present invention is to provide a controlling device for motor vehicle clutches which shall cause a more gradual closing of the clutch when the vehicle is being started from a position of rest, than when it is in motion.

With these and other objects in view, as will hereinafter appear, the present invention consists in the devices and combinations of devices herein described, and more particularly defined in the claims.

In the accompanying drawings which illustrate what is now considered the preferred embodiment of one form of the present invention, Figure 1 is a side view partly in section of a portion of a motor vehicle provided with my improved clutch controlling device; Fig. 2 is a top plan view of the same, and Fig. 3 is an end view partly in section on line 3—3 of Fig. 2 looking toward the left.

In the specific embodiment of the improved clutch controlling device illustrated in the drawings, the cylinder 11, closed at its rear end 12, is provided with a piston 13 movable therein, the piston rod 14 being guided by the front end 15 of the cylinder through which it loosely passes.

Pivoted upon the cross member 16 of the frame of the motor vehicle is the horizontal lever 17 pivotally connected to the end of the piston rod 14. The pivoted lever 17 is connected intermediate its ends with the clutch lever 18 by means of an adjustable link 19 comprising the rods 20 and 21 having their adjacent ends provided one with a right hand thread, and the other with a left hand thread connected by the turn-buckle 22 and check nuts 23. The clutch lever 18 is moved forward (to the left in Fig. 1) by the foot of the operator upon the pedal 24 to release or disengage the clutch. When pressure upon the pedal is removed, the clutch lever 18 will be swung back (to the right in Fig. 1) under the action of the clutch spring to close or engage the clutch.

Through the connections above described the piston 13 will move forward and backward simultaneously with the clutch lever 18 and connecting link 19, an increased amplitude of movement, however, being imparted to the piston 13 by connecting the piston rod to the lever 17 at a much greater distance from the pivot of said lever than the link 19 is connected.

In order to permit the pivoted end of the piston rod 14 to move in the arc of a circle determined by the pivoted lever 17, the cylinder 11 is pivotally supported at its rear end to swing about a vertical axis by means of an arm or rod 25 rigidly secured in the closed end 12 of the cylinder, and having a downwardly extending portion 26 which passes through a hole in the cross member 27 of the frame of the motor vehicle. The front end of the cylinder is supported by the piston rod 14.

Air is admitted freely to the cylinder during the outward movement of the piston corresponding to the releasing or disengagement of the clutch through a check valve 28 which normally tends to close and to prevent the escape of air from the cylinder during the return movement of the piston which corresponds to the closing or engagement of the clutch.

In order to permit the clutch to close gradually an escape valve 30 is mounted on the closed end of the cylinder and is provided with the handle 31 for regulating the rate of escape of air from the cylinder, and hence the duration of time required for the closing movement of the clutch. By adjusting the escape valve the clutch may be caused to engage faster or slower, according to the requirements of the particular design of clutch with which this controlling device is used, or to the individual preferences of the operator.

With the different types and designs of clutch in use at the present time, there is more or less lost motion or excess of movement of the clutch lever beyond that required for completely releasing the clutch, and in order to obtain a substantially uniform duration of closing movement of the clutch irrespective of the extent of movement of the clutch lever beyond that required to release or disengage the clutch, the cylinder 11 has been provided with the open port 33 intermediate its ends so that it will be passed by the piston during its inward or compression stroke. This port is so located that it will permit the free escape of air from the cylinder during the first portion of the inward or compression stroke of the piston which corresponds to the idle portion of the return movement of the clutch lever before the clutch actually begins to engage. Shortly after the passage of this open port 33 by the piston 13, the engagement of the clutch begins and progresses gradually as the air escapes through the valve 30 and permits the piston 13 to continue its inward or compression stroke.

Simple and convenient means have been provided for varying the point in the clutch closing movement of the clutch lever 18 at which the free escape of air from the cylinder ceases and the control of the closing movement of the clutch through the escape valve begins, and these means consist of the adjustable connecting link 19 with its turn-buckle 22. By rotating the turn-buckle to shorten the link, the range of movement of the piston will be moved outwardly or away from the closed end 12, and the checking or retarding of the closing movement of the clutch will occur at a later point in the clutch closing movement of the clutch lever 18. By adjusting the turn-buckle in the opposite direction so that the link is lengthened, the range of movement of the piston will be carried toward the closed end of the cylinder, and the checking or retarding will occur at an earlier point in the clutch closing movement of the clutch lever 18.

Preferably the turn-buckle will be first adjusted so that the checking of the closing movement of the clutch will begin substantially at the instant the clutch faces come into engagement, after which the escape valve 30 will be adjusted to give the requisite duration of clutch closing movement.

Where the closing of the clutch has been entirely under the control of the operator it is the common practice to apply or close the clutch more gradually when starting the vehicle in motion, as when the low speed or the reverse gears are in action, than when the vehicle is under way and the intermediate gears or high speed are in action. Accordingly I have provided means whereby my improved clutch controlling device will permit the clutch to close more gradually when the vehicle is being started in motion than when it is moving, and briefly these means comprise devices controlled by the gear shifting lever for holding open the check valve to permit the escape of air from the cylinder through the check valve when the gear shifting lever is in other than the low speed or reverse position.

Depending from the check valve 28 is the guide or stem 35 for the tappet 36 adapted to be raised to open the check valve by the cam 37 pivoted in the lower slotted end of the stem 35. The cam is normally held in the position shown in Fig. 3 by a spring 38 thus holding the check valve open, but when the gear shifting lever is in position for low speed or reverse movement, the cam is swung to the right in Fig. 3 against the tension of spring 38, permitting the check valve to close on the compression stroke of the piston 13, so that the escape of air from the cylinder 11 is limited to the escape valve 30.

In the illustrated embodiment of the present invention my improved clutch controlling device is shown as applied to a 4-speed transmission. In Fig. 2 is shown the slotted plate or bracket 39 for the gear shifting lever 40 with the position of the lever for the different speeds indicated in dotted outlines. Adjacent the positions for low speed and reverse is pivoted an elbow lever 41, the upper horizontal arm 42 of which is in the form of a plate with its side, one end of which is beveled, extending over the low speed and reverse slot in the gear shifting lever bracket 39. The lower end of the elbow lever 41 is connected by means of the cable 43 with the cam 37.

When the gear shifting lever 40 is moved into low speed or reverse position, it engages the side of the arm or plate 42 on the elbow lever 41, forcing the same outwardly and through the cable 43 bringing the low part of cam 37 beneath the tappet 36 so that the escape of air from the cylinder 11 is wholly through the escape valve 30, and the maximum retarding effect on the clutch is obtained. As soon as the gear shifting lever is moved to second, third or fourth speed positions, it passes out of engagement with the arm 42 and the spring 38 swings the cam 37 back to position shown in Fig. 2, causing the tappet 36 to raise and hold raised the check valve 28, thus affording an additional means of escape of the air from the cylinder 11 and diminishing the retarding effect upon the clutch closing movement. If desired, the parts may be so constructed and arranged that substantially the free escape of air from the cylinder at this time will be permitted, so that no substantial retarding effect of the clutch closing movement will be present.

From the foregoing description it will be observed that my improved clutch controlling device is simple in construction and certain in operation, as it has no long pipes or multiplicity of valves to leak or get out of order. Furthermore it may be easily and quickly applied to, and adjusted to, different types and designs of clutch and also to suit the requirements of individual operators.

The operation of my improved clutch controlling device is as follows: The mechanism having been installed on the motor vehicle, it is adjusted in the following manner: The escape valve 30 having been closed, the gear shifting lever is set in low speed or reverse position, thus swinging the cam 37 against the tension of spring 38 to bring the lowest part of the cam beneath the tappet 36, thus permitting the check valve to remain closed during the compression stroke of the piston 13. The link 19 is then adjusted by means of the turn-buckle 22 preferably until the clutch just begins to engage, when the clutch lever 18 is fully released by the operator. The escape valve 30 is then adjusted by means of the hand wheel 31 to permit the air to escape from the cylinder at such a rate that the clutch will be closed or engaged with the desired amount of preliminary slipping.

In the regular operation of the motor vehicle when it is desired to start the vehicle in motion the clutch will first be released or disengaged by the operator, thus causing the piston 13 to move outwardly from the closed end of the cylinder. The gear shifting lever 40 will then be placed in low speed or reverse position, as the case may be, thus automatically actuating the cam 37 to permit the check valve 28 to close. When the operator releases the clutch lever 18 the piston 13 will move freely in the cylinder until it passes the port 33, at which time the clutch begins to engage. Thereafter the clutch will close gradually, depending upon the rate of escape of air from the cylinder 11 through the valve 30. It will be noted that the extent to which the clutch lever 18 is pushed forward after the clutch has been released in no way varies the time required for the complete closing of the clutch, which always remains uniform.

If the operator shifts the lever 40 from low speed to second, the cam 37 is automatically actuated by the spring 38 to open the check valve 28 so that when the clutch lever 18 is released the air may escape from the cylinder both through the check valve 28 as well as through the escape valve 30, thus permitting the clutch to close with little or no retardation by the piston 13.

While I have shown and described what is now considered to be the preferred embodiment of one form of the present invention, it is to be understood that my invention is not limited thereto, but that the form and arrangement of the parts may be modified and varied within the limitations defined by the following claims.

Having thus described the present invention, what is claimed is:

1. In a clutch, the combination with a pair of clutch members relatively movable into and out of engagement, of means for moving the members into engagement, a cylinder closed at one end, and having an open port located intermediate the limits of movement of the piston, a piston movable in the cylinder, means for permitting the retarded escape of air from the cylinder adjacent the closed end, and adjustable connections between the piston and the movable member of the clutch having provision for varying the extent of movement of the piston between the open port and the closed end of the cylinder.

2. In a clutch, the combination with a pair of clutch members relatively movable into and out of engagement, of means for moving the members into engagement, a cylinder closed at one end and having an open port located intermediate the limits of movement of the piston and discharging into the open air, a piston movable in the cylinder, means for permitting the retarded escape of air from the cylinder adjacent the closed end and into the open air, and positive connections between the piston and the movable member of the clutch, the cylinder and piston being relatively adjustable to vary the effective compression stroke of the piston.

3. In a clutch, the combination with a pair of clutch members relatively movable into and out of engagement, a spring for moving the members into engagement, a cylinder closed at one end, a piston, connections between the piston and the movable member of the clutch, means for permitting the retarded escape of air from the cylinder adjacent the closed end, devices adjacent the closed end of the cylinder for permitting the free passage of air into the cylinder and normally preventing the escape of air, and mechanism under the control of the operator for actuating said devices to permit the free escape of air from the cylinder.

4. In a motor vehicle the combination with a gear shifting lever, of a pair of clutch members relatively movable into and out of engagement, a spring for moving the members into engagement, a cylinder closed at one end, a piston movable in the cylinder, a valve mounted upon the cylinder adjacent the closed end arranged to permit the free passage of air into the cylinder and tending normally to prevent the free escape of air from the cylinder, means adjacent the valve for actuating the same to permit the free escape of air from the cylinder, said means being controlled by the gear shifting lever, and connections between the piston and the movable member of the clutch.

5. In a motor vehicle the combination with a gear shifting lever, of a pair of clutch members relatively movable into and out of engagement, a spring for moving the members into engagement, a cylinder closed at one end, a piston movable in the cylinder, connections between the piston and the movable member of the clutch, a check valve connected with the cylinder adjacent its closed end and arranged to permit the free passage of air into the cylinder, an escape valve mounted upon the cylinder for permitting the retarded escape of air from the cylinder, and means adjacent the check valve and controlled by the gear shifting lever for holding the check valve open to permit the escape of air from the cylinder.

6. In a motor vehicle the combination with a gear shifting lever, of a pair of clutch members relatively movable into and out of engagement, a spring for moving the members into engagement, a cylinder closed at one end, a piston movable in the cylinder, a check valve connected with the cylinder adjacent its closed end and arranged to permit the free passage of air into the cylinder, means for holding the check valve open to permit the escape of air from the cylinder, connections for automatically causing the valve to close when the gear shifting lever is in normal position for starting the vehicle in motion, and connections between the piston and movable member of the clutch.

7. In a motor vehicle the combination with a gear shifting lever, of a pair of clutch members relatively movable into and out of engagement, a spring for moving the members into engagement, a cylinder closed at one end, a piston movable in the cylinder, a check valve connected with the cylinder adjacent its closed end and arranged to permit the free passage of air into the cylinder, means for holding the check valve open to permit the escape of air from the cylinder, a gear shifting lever guide plate, an arm overlapping the low speed and reverse slots in the plate, connections between the arm and the check valve for causing the valve to close when the arm is engaged by the gear shifting lever, and connections between the piston and the movable member of the clutch.

JOHN E. HOLDEN.

Witnesses:
THOMAS M. MORAN,
CHARLES A. JACKSON.